(12) United States Patent
Lee et al.

(10) Patent No.: US 11,386,706 B1
(45) Date of Patent: Jul. 12, 2022

(54) DEVICE AND METHOD FOR CLASSIFYING BIOMETRIC AUTHENTICATION DATA

(71) Applicant: Suprema Inc., Seongnam-si (KR)

(72) Inventors: Hyogi Lee, Seongnam-si (KR); Kideok Lee, Seongnam-si (KR); Bong Seop Song, Seongnam-si (KR)

(73) Assignee: Suprema Inc., Seongnam-si (KR)

( * ) Notice: Subject to any disclaimer, the term of this patent is extended or adjusted under 35 U.S.C. 154(b) by 0 days.

(21) Appl. No.: 17/537,988

(22) Filed: Nov. 30, 2021

(30) Foreign Application Priority Data

Nov. 17, 2021 (KR) .......................... 10-2021-0158733

(51) Int. Cl.
  *G06V 40/16* (2022.01)
  *G06N 20/00* (2019.01)
(52) U.S. Cl.
  CPC ........... *G06V 40/172* (2022.01); *G06N 20/00* (2019.01)
(58) Field of Classification Search
  CPC . G06V 40/172; G06V 10/70–87; G06N 20/00
  See application file for complete search history.

(56) References Cited

U.S. PATENT DOCUMENTS

| 11,113,574 | B1* | 9/2021 | Ryu | G06V 10/82 |
| 2018/0260735 | A1* | 9/2018 | Arad | G06N 20/00 |
| 2021/0394065 | A1* | 12/2021 | Nakada | A63F 13/56 |

FOREIGN PATENT DOCUMENTS

KR  20210050414 A  5/2021

\* cited by examiner

*Primary Examiner* — Mark Roz
(74) *Attorney, Agent, or Firm* — Maier & Maier, PLLC

(57) ABSTRACT

A method for adding biometric authentication training data into databases performed by a biometric authentication data classification device includes: extracting first biometric characteristic information from at least one candidate biometric training data for biometric authentication using an artificial neural network model; calculating an overall similarity between the first biometric characteristic information and second biometric characteristic information extracted from a performance test database of which a biometric authentication performance is lower than a threshold level, the performance test database being selected among performance test databases for the biometric authentication; and adding the at least one candidate biometric training data into one of the biometric authentication training database and the performance test database based on the calculated overall similarity.

7 Claims, 3 Drawing Sheets

DEVICE AND METHOD FOR CLASSIFYING BIOMETRIC AUTHENTICATION DATA

CROSS-REFERENCE TO RELATED APPLICATION

This application claims priority to Korean Patent Application No. 10-2021-0158733, filed on Nov. 17, 2021. The entire contents of the application on which the priority is based are incorporated herein by reference.

TECHNICAL FIELD

The present disclosure relates to a device for classifying biometric authentication data and a method for classifying the biometric authentication data using the device.

This work was supported by Institute of Information & communications Technology Planning & Evaluation (IITP) grant funded by the Korea government(MSIT) (Project unique No.: 1711120097; Project No.: 2020-0-01787-001; Government department: Ministry of Science and ICT; R&D management Agency: Institute of Information & communications Technology Planning & Evaluation; R&D project: ITRC R&D; Research Project Title: Development of communication/computing-integrated revolutionary technologies for superintelligent services; Managing department: Korea Advanced Institute of Science and Technology; and Project period: 2021.01.01~2021.12.31).

BACKGROUND

As already known, information such as a face, a voice, a hand shape, an iris, a vein and a fingerprint is used for present biometric authentication system, and various studies are being progressed about authentication for each biometric information.

Among various biometric authentication systems, 2D face image authentication and 3D face image authentication are publicly known. According to the 2D face image authentication, the face is detected from the 2D face image, inherent characteristics are extracted from the detected face, and the authentication is determined according to the degree of identification between the extracted characteristics and registered characteristic information. The 2D face image authentication has a drawback that a decrease of an authentication performance occurs depending upon the direction of the detected face. According to the 3D face image authentication, the face is detected using 3D data information extracted from a 3D image device, inherent characteristics are extracted from the detected face, and the authentication is determined according to the degree of identification between the extracted characteristics and registered characteristic information.

Meanwhile, as deep learning technologies are being applied to various fields recently, deep learning models are being applied to the field of the face image authentication. For example, the extraction of face characteristic information and the face authentication may be performed by a convolutional neural network (CNN) which is one type of deep learning and is being broadly used for object recognition.

However, the performance of the deep learning based face recognition and authentication is dependent upon the face database used in training, and there are considerable differences in performance according to the composition of the database used in performance tests.

Further, in order to improve the performance of face recognition and authentication, it is required to newly train the deep learning network, and in this case, it may be required to improve the training database used in training and/or the performance test database used in performance tests, not the deep learning network itself.

However, there was a difficulty in determining that face data having which kind of characteristic information need to be stored in the training database and/or the performance test database to improve the database.

PRIOR ART DOCUMENT

Korean Patent Publication No. 10-2021-0050414, Publication date: May 7, 2021.

SUMMARY

According to an embodiment of the present disclosure, a device and a method for classifying biometric data candidates for biometric authentication using an artificial neural network model into biometric training data and performance test data are provided.

The problem to be solved by the present disclosure is not limited to the above description, and another problem to be solved that is not mentioned may be clearly understood by those skilled in the art to which the present disclosure belongs from the following description.

In accordance with a first aspect of the present disclosure, there is provided a method for adding biometric authentication training data into a database performed by a biometric authentication data classification device, including: extracting first biometric characteristic information from at least one candidate biometric training data for biometric authentication using an artificial neural network model; calculating an overall similarity between the first biometric characteristic information and second biometric characteristic information extracted from a performance test database of which a biometric authentication performance is lower than a threshold level, the performance test database being selected among performance test databases for the biometric authentication; and adding the at least one candidate biometric training data into one of the biometric authentication training database and the performance test database based on the calculated overall similarity.

The adding the at least one candidate biometric training data may be performed by using a comparison result of the calculated overall similarity and a predetermined similarity threshold value.

The at least one biometric data candidate may be in plural number, and the adding at least one candidate biometric training data includes adding the at least one candidate biometric training data into one of the biometric authentication training database and the performance test database based on a predetermined distribution ratio after uniformly distributing overall similarity values calculated for a biometric training data candidate cluster in which the plurality of candidate biometric training data are clustered.

The biometric authentication may be face authentication, and the first biometric characteristic information and the second biometric characteristic information may include at least one of an age characteristic, a race characteristic, or a gender characteristic.

The calculating the overall similarity may include: calculating a characteristic similarity of the age characteristic, a characteristic similarity of the race characteristic, and a characteristic similarity of the gender characteristic; and multiplying the calculated characteristic similarities of the age characteristic, the race characteristic, and the gender characteristic to determine a result of the multiplying as the overall similarity.

The overall similarity may be calculated by an equation as follows:

$$V = W_a S_a(A,B) \times W_e S_e(A,B) \times W_s S_s(A,B)$$

(Here, $W_a$ is an age characteristic weight, $W_e$ is a race characteristic weight, $W_s$ is a gender characteristic weight, $S_a$ is an age characteristic similarity, $S_e$ is a race characteristic similarity, $S_s$ is a gender characteristic similarity, A is first face characteristic information, and B is second face characteristic information).

In accordance with a second aspect of the present disclosure, there is provided a biometric authentication data classification device, including: an information extraction unit configured to extract biometric characteristic information from at least one candidate biometric training data for biometric authentication using an artificial neural network model; and a processor unit configured to perform a processing of the biometric characteristic information, wherein the information extraction unit extracts first biometric characteristic information from the at least one candidate biometric training data to provide the first biometric characteristic information to the processor unit, and the processor unit calculates an overall similarity between the first biometric characteristic information and second biometric characteristic information extracted from a performance test database of which a biometric authentication performance is lower than a threshold level, the performance test database being selected among performance test databases for biometric authentication, and adds the at least one candidate biometric training data into one of biometric authentication training database and the performance test database based on the calculated overall similarity.

The processor unit may add the at least one candidate biometric training data by using a comparison result of the calculated overall similarity and a predetermined similarity threshold value when adding the at least one candidate biometric training data.

The at least one candidate biometric training data may be in plural number, and when adding the at least one candidate biometric training data, the processor unit may uniformly distribute overall similarity values calculated for biometric training data candidate cluster in which a plurality of candidate biometric training data are clustered, and adds the at least one candidate biometric training data into one of the biometric authentication training database and the performance test database based on a predetermined distribution ratio.

The biometric authentication may be face authentication, and the first biometric characteristic information and the second biometric characteristic information may include at least one of an age characteristic, a race characteristic, or a gender characteristic.

The processor unit may calculate a characteristic similarity of the age characteristic, a characteristic similarity of the race characteristic, and a characteristic similarity of the gender characteristic, and multiply the calculated characteristic similarities of the age characteristic, the race characteristic, and the gender characteristic to determine a result of the multiplying as the overall similarity.

The overall similarity may be calculated by an equation as follows:

$$V = W_a S_a(A,B) \times W_e S_e(A,B) \times W_s S_s(A,B)$$

(Here, $W_a$ is an age characteristic weight, $W_e$ is a race characteristic weight, $W_s$ is a gender characteristic weight, $S_a$ is an age characteristic similarity, $S_e$ is a race characteristic similarity, $S_s$ is a gender characteristic similarity, A is first face characteristic information, and B is second face characteristic information).

In accordance with a third aspect of the present disclosure, there is provided a computer readable storage medium configured to store therein a computer program, the computer program comprising a command for a processor to execute a method for adding biometric authentication training data into a database performed by a biometric authentication data classification device, wherein the method includes: extracting first biometric characteristic information from at least one candidate biometric training data for biometric authentication using an artificial neural network model; calculating an overall similarity between the first biometric characteristic information and second biometric characteristic information extracted from a performance test database of which a biometric authentication performance is lower than a threshold level, the performance test database being selected among performance test databases for the biometric authentication; and adding the at least one candidate biometric training data into one of the biometric authentication training database and the performance test database based on the calculated overall similarity.

According to an embodiment of the present disclosure, it is possible to classify the biometric data candidates for biometric authentication using the artificial neural network model into the biometric training data and the performance test data. According to the classification result, it is possible to improve the biometric training database and the performance test database, and thus, it is possible to improve the performance of biometric recognition and authentication such as face recognition and authentication.

DETAILED DESCRIPTION

Figure 1:
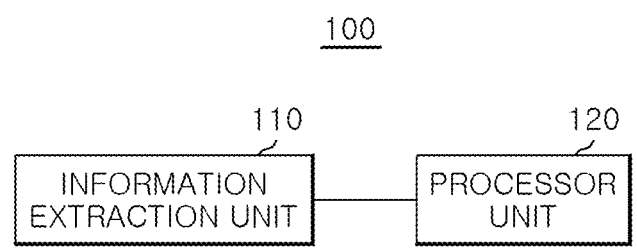
FIG. 1 is a block diagram of a biometric authentication data classification device according to an embodiment of the present disclosure.

The advantages and features of embodiments of the present disclosure and the methods of accomplishing the embodiments will be clearly understood from the following description taken in conjunction with the accompanying drawings. However, the present disclosure is not limited to those embodiments described, as embodiments may be implemented in various forms. It should be noted that the present embodiments are provided to make a full disclosure and also to allow those skilled in the art to know the full range of the present disclosure. Therefore, the present disclosure is to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components such as software components, object-oriented software components, class components, and task components, processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

FIG. 1 is a block diagram of a biometric authentication data classification device 100 according to the embodiment of the present disclosure.

Referring to FIG. 1, the biometric authentication data classification device 100 according to the embodiment of the present disclosure may include an information extraction unit 110 and a processor unit 120.

The information extraction unit 110 may extract biometric characteristic information from biometric data for biometric authentication using an artificial neural network model, and provide the extracted biometric characteristic information to the processor unit 120. The information extraction unit 110 may extract biometric characteristic information (hereinafter, first biometric characteristic information) from candidate biometric training data, and provide the extract biometric characteristic information to the processor unit 120. For example, it is possible to extract face characteristic information from face image data candidates for face authentication and provide the face characteristic information to the processor unit 120.

The processor unit 120 may perform processing of the first biometric characteristic information provided from the information extraction unit 110. For example, the processor unit 120 may include at least one of a microprocessor, a central processing unit (CPU), or a graphics processing unit (GPU).

The information extraction unit 110 may extract second biometric characteristic information from performance test database of which a biometric authentication performance is lower than a level of expectation (i.e., threshold level). The performance test database is selected among performance test databases for the biometric authentication The processor unit 120 may calculate an overall similarity between the first biometric characteristic information and the second biometric characteristic information. The processor unit 120 may add the candidate biometric training data into one of authentication training database and the performance test database. Here, the processor unit 120 may classify the candidate biometric training data into one of authentication training database and the performance test database using a comparison result of the calculated overall similarity and a predetermined similarity threshold value. Otherwise, the processor unit 120 may uniformly distribute overall similarity values calculated for biometric data candidate cluster in which a plurality of biometric data candidates are clustered, and add them into one of the biometric authentication training database and the performance test database according to a predetermined distribution ratio.

For example, the biometric authentication using the artificial neural network model may be face authentication, and the first biometric characteristic information and the second biometric characteristic information may include at least one of an age characteristic, a race characteristic, or a gender characteristic. For example, the first biometric characteristic information and the second biometric characteristic information may include all of the age characteristic, the race characteristic and the gender characteristic. When the processor unit 120 calculates the overall similarity, the processor unit 120 may calculate a characteristic similarity of the age characteristic, a characteristic similarity of the race characteristic, and a characteristic similarity of the gender characteristic, multiply the characteristic similarity of the age characteristic, the characteristic similarity of the race characteristic, and the characteristic similarity of the gender characteristic, and determine a result of multiplying characteristic similarities as the overall similarity.

Figure 2:
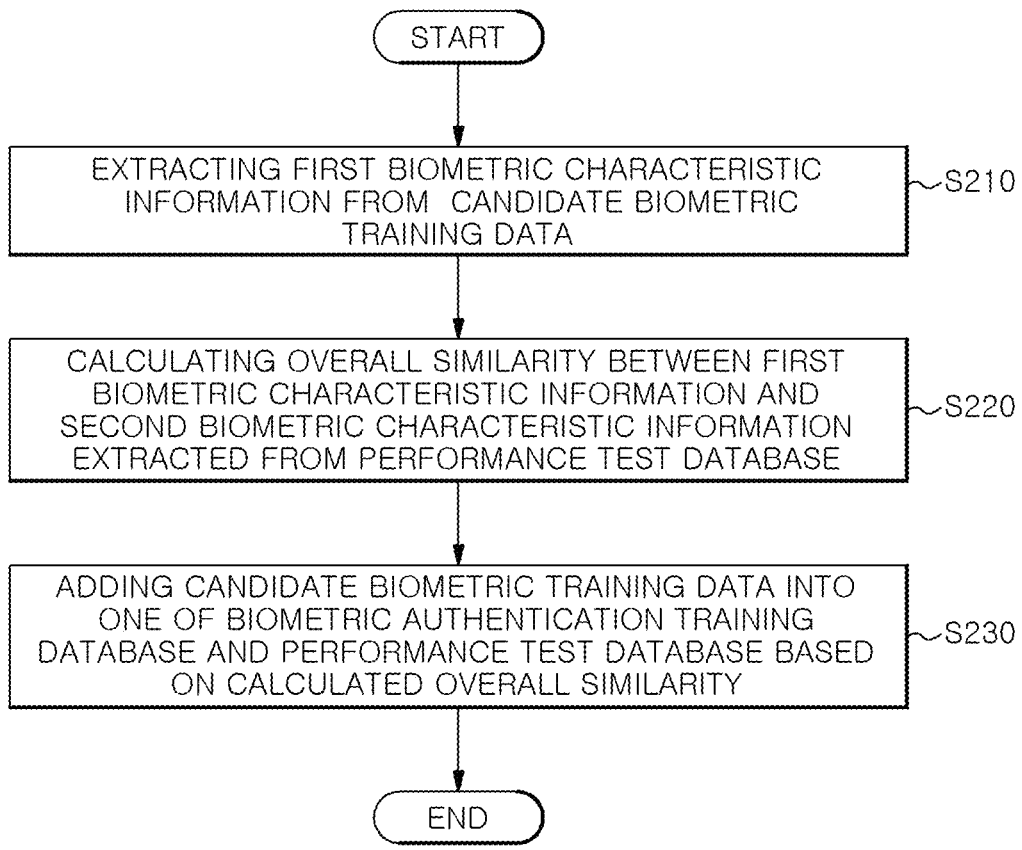
FIG. 2 is a flowchart for explaining a method for adding biometric authentication training data into databases performed by the biometric authentication data classification device according to the embodiment of the present disclosure.
Figure 3:
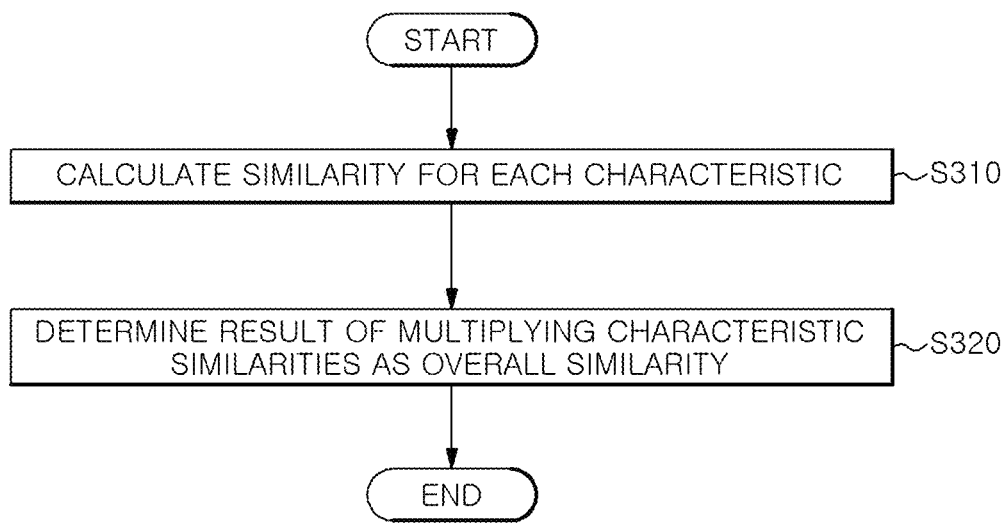
FIG. 3 is a flowchart for explaining a method for adding biometric authentication training data into databases performed by the biometric authentication data classification device according to the embodiment of the present disclosure.

FIGS. 2 and 3 are flowcharts for explaining a method for adding biometric authentication training data into databases performed by the biometric authentication data classification device 100 according to the embodiment of the present disclosure.

Hereinafter, referring to FIGS. 1 to 3, the process that the biometric authentication data classification device 100 adds the biometric authentication training data into databases according to the embodiment of the present disclosure will be explained. In the below description, an example that the biometric authentication data classification device 100 performs the face authentication among biometric authentications will be explained. However, the present disclosure is not limited to the below description.

As described above, the performance of face recognition and authentication based on deep learning is dependent upon the face database used in training, and there are considerable differences in performance according to the composition of the database used in performance tests.

Further, in order to improve the performance of face recognition and authentication, it is required to newly train the deep learning network, and in this case, it may be required to improve the training database used in training and/or the performance test database used in performance tests, not the deep learning network itself.

In this environment, the biometric authentication data classification device 100 according to the embodiment of the present disclosure may support to determine face data having which kind of characteristic information need to be stored in the face training database and/or in the recognition performance test database.

First, face image data candidates extracted from a database in which face image data candidate cluster in which a plurality of biometric data candidates are clustered is stored may be input into the information extraction unit 110.

Then, the information extraction unit 110 may extract first face characteristic information from the input face image data candidates, and provide them to the processor unit 120. For example, the information extraction unit 110 may include an artificial neural network model in which a face training data set has been pre-learned, and this artificial neural network model may extract the first face characteristic information from the face image data candidates (step S210).

Then, the processor unit 120 may calculate the overall similarity between second face characteristic information extracted from performance test data of which a face recognition performance is lower than a threshold level among performance test databases for face image authentication and the first face characteristic information provided from the information extraction unit 110 (step S220).

The second face characteristic information to be compared with the first face characteristic information by the processor unit 120 may be extracted by various subjects. For example, after a deep learning based face recognition algorithm tests the face recognition performance for the face recognition performance test database, a performance test database having low recognition performance may be constructed by selecting face image data showing lower performance than predetermined face recognition performance. In this environment, the deep learning based face recognition algorithm which is different from the biometric authentication data classification device 100 may extract the second face characteristic information from the performance test database having low recognition performance. Otherwise, the performance test database having low recognition performance is provided in the biometric authentication data classification device 100, and the information extraction unit 110 may extract the second face characteristic information from the performance test database having low recognition performance.

When the processor unit 120 calculates the overall similarity of the first face characteristic information and the second face characteristic information, the processor unit 120 may calculate the characteristic similarity of the age characteristic, the characteristic similarity of the race characteristic, and the characteristic similarity of the gender characteristic (step S310), and multiply characteristic similarities to determine a result of multiplying characteristic similarities as the overall similarity (step S320).

For example, the processor unit 120 may use the following equation 1 when calculating the overall similarity (V). Here, the characteristics are exemplified as three types, but the number of types may be increased.

$$V = W_a S_a(A,B) \times W_e S_e(A,B) \times W_s S_s(A,B) \quad \text{(equation 1)}$$

Here, $W_a$ is an age characteristic weight, $W_e$ is a race characteristic weight, $W_s$ is a gender characteristic weight, $S_a$ is an age characteristic similarity, $S_e$ is a race characteristic similarity, $S_s$ is a gender characteristic similarity, A is first face characteristic information, and B is second face characteristic information.

Each characteristic weight W is a value that may be given based on a characteristic distribution for a characteristic showing relatively low performance. For example, if relatively more information on a predetermined race is included in the second face characteristic information, a high weight may be given to the race characteristic. Otherwise, information for all age are uniformly included in the second face characteristic information without including more information on a predetermined age, a low weight may be given to the age characteristic.

Then, the processor unit 120 may classify the face image data candidates into one of face image training data and face recognition performance test data based on the calculated overall similarity (step S230).

For example, using a comparison result of the calculated overall similarity and the predetermined similarity threshold value, the processor unit 120 may classify the face image data candidates into one of the face image training data and the face recognition performance test data, and add the face image data candidates into one of a pre-existing face image training database and a pre-existing face recognition performance test database. For example, if the overall similarity is equal to or greater than the predetermined threshold value, it may be classified as the face image training data. If the overall similarity is smaller than the predetermined threshold value, it may be classified as the face recognition performance test data.

Otherwise, the processor unit 120 may classify the face image data candidates into one of the face image training data and the face recognition performance test data according to a predetermined distribution ratio after uniformly distributing the overall similarity values calculated for the face image data candidates. For example, top 30% may be classified as the face image training data, and bottom 70% may be the face recognition performance test data.

As described above, the face image training data classified by the biometric authentication data classification device 100 may be added to the pre-existing face image training database, and the face recognition performance test data classified by the biometric authentication data classification device 100 may be added to the pre-existing face recognition performance test database. Like this, by performing training and testing for deep learning based face authentication algorithm using the face image training database and the face recognition performance test database which are newly constructed through data addition, it is possible to improve face recognition performance.

Meanwhile, each step included in the biometric authentication data classifying method performed by the biometric authentication data classification device may be embodied in computer readable storage medium configured to store a computer program including commands for performing the each step.

The combinations of the respective blocks of a block diagram or the respective sequences of a flow diagram attached herein may be carried out by computer program instructions. Since the computer program instructions may be executed by the processor of a general purpose computer, a special purpose computer, or other programmable data processing apparatus, the instructions, executed by the processor of the computer or other programmable data processing apparatus, create means for performing functions described in the respective blocks of a block diagram or the respective sequences of the flow diagram. The computer program instructions, in order to implement functions in a specific manner, may be stored in a computer-readable storage medium or a computer-useable storage medium for a computer or other programmable data processing apparatus, and the instructions stored in the computer-readable storage medium or the computer-useable storage medium may produce manufacturing items that include means for instructions to perform the functions described in the respective blocks of a block diagram or the respective sequences of the flow diagram. The computer program instructions may be loaded in a computer or other programmable data processing apparatus, and therefore, the instructions, which are a series of sequences executed in a computer or other programmable data processing apparatus to create processes executed by a computer to operate a computer or other programmable data processing apparatus, may provide operations for executing functions described in the respective blocks of a block diagram or the respective sequences of the flow diagram.

Moreover, the respective block or the respective sequences may refer to some of modules, segments, or codes including at least one executable instruction for executing a specific logic function(s). In some alternative embodiments, it is noted that the functions described in the blocks or the sequences may be run out of order. For example, two consecutive blocks or sequences may be executed simultaneously or in reverse order according to the particular function.

The above description illustrates the technical idea of the present disclosure, and it will be understood by those skilled in the art to which this present disclosure belongs that various changes and modifications may be made without departing from the scope of the essential characteristics of the present disclosure. Therefore, the exemplary embodiments disclosed herein are not used to limit the technical idea of the present disclosure, but to explain the present disclosure, and the scope of the technical idea of the present disclosure is not limited by those embodiments. Therefore, the scope of protection of the present disclosure should be construed as defined in the following claims, and all technical ideas that fall within the technical idea of the present disclosure are intended to be embraced by the scope of the claims of the present disclosure.

What is claimed is:

1. A method for adding biometric authentication training data into a database performed by a biometric authentication data classification device, comprising:
    extracting first biometric characteristic information from at least one candidate biometric training data for biometric authentication using an artificial neural network model;
    calculating an overall similarity between the first biometric characteristic information and second biometric characteristic information extracted from a performance test database of which a biometric authentication performance is lower than a threshold level, the performance test database being selected among performance test databases for the biometric authentication; and
    adding the at least one candidate biometric training data into one of the biometric authentication training database and the performance test database based on the calculated overall similarity, and
    wherein the at least one biometric data candidate is in plural numbers, and
    the adding of at least one candidate biometric training data includes adding the at least one candidate biometric training data into one of the biometric authentication training database and the performance test database based on a predetermined distribution ratio after uniformly distributing overall similarity values calculated for a biometric training data candidate cluster in which the plurality of candidate biometric training data are clustered.

2. The method of claim 1, wherein the adding of the at least one candidate biometric training data is performed by using a comparison result of the calculated overall similarity and a predetermined similarity threshold value.

3. The method of claim 1, wherein the biometric authentication is face authentication, and
    the first biometric characteristic information and the second biometric characteristic information include at least one of an age characteristic, a race characteristic, or a gender characteristic.

4. A biometric authentication data classification device, comprising:
    an information extraction unit configured to extract biometric characteristic information from at least one candidate biometric training data for biometric authentication using an artificial neural network model; and
    a processor unit configured to perform a processing of the biometric characteristic information,
    wherein the information extraction unit extracts first biometric characteristic information from the at least one candidate biometric training data to provide the first biometric characteristic information to the processor unit, and
    the processor unit calculates an overall similarity between the first biometric characteristic information and second biometric characteristic information extracted from a performance test database of which a biometric authentication performance is lower than a threshold level, the performance test database being selected among performance test databases for biometric authentication, and adds the at least one candidate biometric training data into one of biometric authentication training database and the performance test database based on the calculated overall similarity, and
    wherein the at least one candidate biometric training data is in plural numbers, and
    when adding the at least one candidate biometric training data, the processor unit uniformly distributes overall similarity values calculated for biometric training data candidate cluster in which a plurality of candidate biometric training data are clustered, and adds the at least one candidate biometric training data into one of the biometric authentication training database and the performance test database based on a predetermined distribution ratio.

5. The device of claim 4, wherein the processor unit adds the at least one candidate biometric training data by using a comparison result of the calculated overall similarity and a predetermined similarity threshold value when adding the at least one candidate biometric training data.

6. The device of claim 4, wherein the biometric authentication is face authentication, and
    the first biometric characteristic information and the second biometric characteristic information include at least one of an age characteristic, a race characteristic, or a gender characteristic.

7. A computer readable storage medium configured to store therein a computer program, the computer program comprising a command for a processor to execute a method for adding biometric authentication training data into a database performed by a biometric authentication data classification device, wherein the method comprises:

extracting first biometric characteristic information from at least one candidate biometric training data for biometric authentication using an artificial neural network model;

calculating an overall similarity between the first biometric characteristic information and second biometric characteristic information extracted from a performance test database of which a biometric authentication performance is lower than a threshold level, the performance test database being selected among performance test databases for the biometric authentication; and adding the at least one candidate biometric training data into one of the biometric authentication training database and the performance test database based on the calculated overall similarity, wherein the at least one biometric data candidate is in plural numbers, and the adding of at least one candidate biometric training data includes adding the at least one candidate biometric training data into one of the biometric authentication training database and the performance test database based on a predetermined distribution ratio after uniformly distributing overall similarity values calculated for a biometric training data candidate cluster in which the plurality of candidate biometric training data are clustered.

* * * * *